(12) United States Patent
Handolescu et al.

(10) Patent No.: US 11,753,186 B2
(45) Date of Patent: Sep. 12, 2023

(54) FLEXIBLE TRUSS SYSTEMS AND METHODS OF TRANSFERRING FLEXIBLE COMPOSITE PARTS USING SUCH SYSTEMS

(71) Applicant: The Boeing Company, Chicago, IL (US)

(72) Inventors: Caleb J. Handolescu, Ladson, SC (US); Luis F. Velasquez, Ladson, SC (US); Allen James Halbritter, Ladson, SC (US)

(73) Assignee: The Boeing Company, Chicago, IL (US)

( * ) Notice: Subject to any disclaimer, the term of this patent is extended or adjusted under 35 U.S.C. 154(b) by 579 days.

(21) Appl. No.: 16/900,434

(22) Filed: Jun. 12, 2020

(65) Prior Publication Data

US 2021/0387747 A1 Dec. 16, 2021

(51) Int. Cl.
  *B64F 5/50* (2017.01)
  *B25J 15/00* (2006.01)
  (Continued)

(52) U.S. Cl.
  CPC ............ *B64F 5/50* (2017.01); *B25J 9/123* (2013.01); *B25J 15/0052* (2013.01);
  (Continued)

(58) Field of Classification Search
  CPC ...... B64F 5/50; B25J 15/0052; B25J 15/0616; B25J 15/0061; B25J 15/0095; B25J 15/06;
  (Continued)

(56) References Cited

U.S. PATENT DOCUMENTS

2015/0314583 A1 11/2015 Jess et al.
2015/0352796 A1 12/2015 Eisele et al.
(Continued)

FOREIGN PATENT DOCUMENTS

| DE | 102013208778 A1 | 11/2014 | |
| DE | 102014008665 A1 * | 12/2015 | .......... B25J 15/0061 |
| DE | 102014008665 A1 | 12/2015 | |

OTHER PUBLICATIONS

DE-102014008665-A1 translation (Year: 2015).*
European Application Serial No. 21178873.2, Search Report dated Dec. 3, 2021, 7 pgs.

*Primary Examiner* — Tyrone V Hall, Jr.
*Assistant Examiner* — Abbie E Quann
(74) *Attorney, Agent, or Firm* — Kwan & Olynick LLP

(57) ABSTRACT

Described herein are flexible truss systems and methods of transferring flexible composite parts using these systems. A flexible truss system comprises a flexible truss mechanism and composite pick-and-place mechanisms supported on the flexible truss mechanism and designed to attach to various composite parts. The flexible truss mechanism comprises flexible elongated members and slidable ribs coupled to each flexible elongated member. Specifically, each rib is slidably coupled to at least one flexible elongated member. In some examples, each rib is also fixedly coupled to another flexible elongated member. The slidable coupling allows the flexible truss mechanism to bend and follow the shape of a supported part, such that the composite pick-and-place mechanisms are able to contact and support different areas of the composite part. As such, the same flexible truss mechanism is able to support flexible composite parts having different shapes.

20 Claims, 10 Drawing Sheets

(51) Int. Cl.
    *B25J 15/06*    (2006.01)
    *B25J 9/12*     (2006.01)
    *B29C 70/54*    (2006.01)
    *B29L 31/30*    (2006.01)

(52) U.S. Cl.
    CPC ....... *B25J 15/0095* (2013.01); *B25J 15/0616* (2013.01); *B25J 15/0625* (2013.01); *B29C 70/541* (2013.01); *B29L 2031/3076* (2013.01)

(58) Field of Classification Search
    CPC ..... B66C 1/0237; B66C 1/0243; B65G 21/22; B65G 21/02; B65G 21/12
    USPC ....................... 269/1, 2, 21; 198/861.1, 861.2
    See application file for complete search history.

(56) References Cited

U.S. PATENT DOCUMENTS

2017/0021465 A1    1/2017    Gamboa
2018/0339463 A1    11/2018   Stone et al.

* cited by examiner

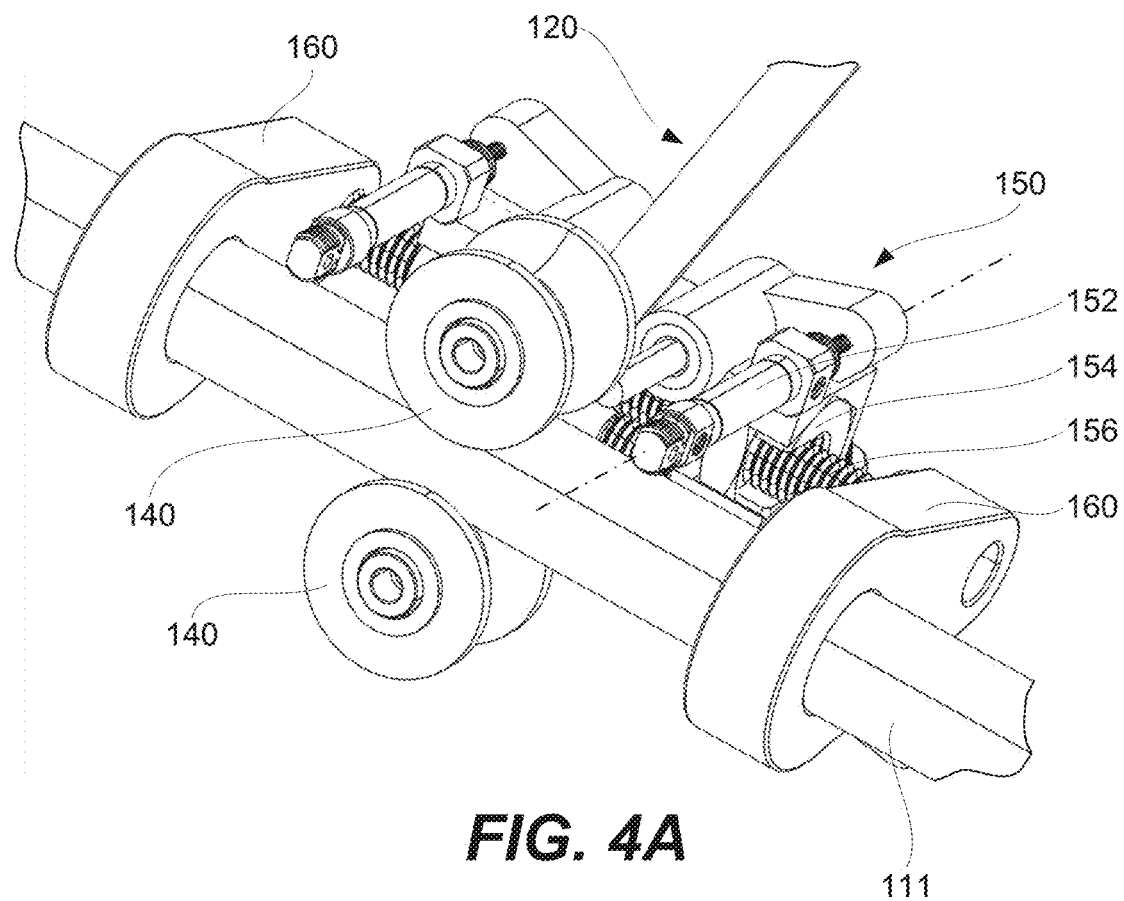
FIG. 4A
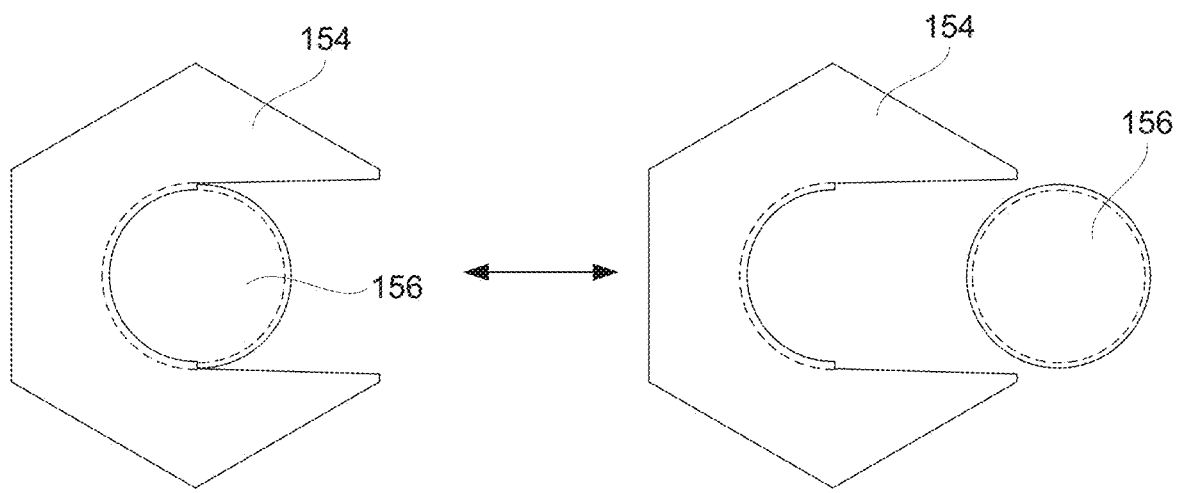
FIG. 4B  FIG. 4C

FLEXIBLE TRUSS SYSTEMS AND METHODS OF TRANSFERRING FLEXIBLE COMPOSITE PARTS USING SUCH SYSTEMS

BACKGROUND

Modern aircraft use various composite parts, which are large and flexible. Handling of these parts during their fabrication, assembly, and other operations can be very challenging. A conventional approach involves manual handling of such parts. However, manual handling requires multiple operators, simultaneously supporting the part at different locations. More importantly, the efforts of multiple operators have to be carefully coordinated to prevent inadequate support in some areas and/or excessive stresses in other areas on the part. Such coordination (involving multiple operators) is quite difficult to achieve. On the other hand, lack of coordination, even for a brief moment, can damage the part. Furthermore, part-specific support fixtures are expensive to make, use, store, and handle.

What is needed are new methods and systems for transferring flexible composite parts.

SUMMARY

Described herein are flexible truss systems and methods of transferring flexible composite parts using these systems. A flexible truss system comprises a flexible truss mechanism and composite pick-and-place mechanisms, supported on the flexible truss mechanism and designed to attach to various composite parts. The flexible truss mechanism comprises flexible elongated members and slidable ribs, coupled to each flexible elongated member. Specifically, each rib is slidably coupled to at least one flexible elongated member. In some examples, each rib is also fixedly coupled to another flexible elongated member. The slidable coupling allows the flexible truss mechanism to bend and follow the shape of a supported part, such that the composite pick-and-place mechanisms are able to contact and support different areas of the composite part. As such, the same flexible truss mechanism is able to support flexible composite parts having different shapes.

In some examples, a flexible truss mechanism comprising flexible elongated members, extending along a principal axis of the flexible truss mechanism, slidable ribs, coupled to each of the flexible elongated members and supporting the flexible elongated members with respect to each other. The slidable ribs are spaced apart from each other along the principal axis of the flexible truss mechanism. The slidable ribs are configured to receive and support one or more composite pick-and-place mechanisms. Each of the slidable ribs is slidably coupled to at least one of the flexible elongated members, thereby allowing each of the slidable ribs to slide relative to the at least one of the flexible elongated members along the principal axis and allowing the flexible elongated members to bend about at least one axis, perpendicular to the principal axis.

In some examples, a flexible truss system comprises a flexible truss mechanism, comprising flexible elongated members, extending along a principal axis of the flexible truss mechanism, and slidable ribs, coupled to each of the flexible elongated members and pick-and-place mechanisms. Each of the pick-and-place mechanisms is supported by a corresponding one of the slidable ribs. Each of the slidable ribs is slidably coupled to at least one of the flexible elongated members, thereby allowing each of the slidable ribs to slide relative to the at least one of the flexible elongated members along the principal axis and allowing the flexible elongated members to bend about at least one axis, perpendicular to the principal axis.

In some examples, a method of transferring a flexible composite part using a flexible truss system comprising a flexible truss mechanism and pick-and-place mechanisms is provided. The method comprises contacting the flexible composite part with each of the pick-and-place mechanisms, supported on the flexible truss mechanism. The flexible truss mechanism comprises flexible elongated members and slidable ribs, coupled to each of the flexible elongated members and supporting the flexible elongated members with respect to each other. The method also comprises contacting the flexible composite part comprises sliding at least one of the slidable ribs relative to at least one of the flexible elongated members, thereby allowing the flexible elongated members to bend and allowing each of the pick-and-place mechanisms to form contact with the flexible composite part. The method also comprises locking the slidable ribs relative to the at least one of the flexible elongated members in set positions, thereby preserving shape of the flexible elongated members and maintaining the contact between each of the pick-and-place mechanisms and the flexible composite part. The method also comprises transferring the flexible composite part using the flexible truss system while maintaining the contact between each of the pick-and-place mechanisms and the flexible composite part.

BRIEF DESCRIPTION OF THE DRAWINGS

FIG. 4A is a schematic illustration of a position lock of a flexible truss mechanism, in accordance with some examples.

FIG. 4B is a schematic illustration of a cutout nut and a threaded position shaft in a shaft-engaging position, in accordance with some examples.

FIG. 4C is a schematic illustration of a cutout nut and a threaded position shaft in a shaft-disengaging position, in accordance with some examples.

DETAILED DESCRIPTION

Figure 1A:
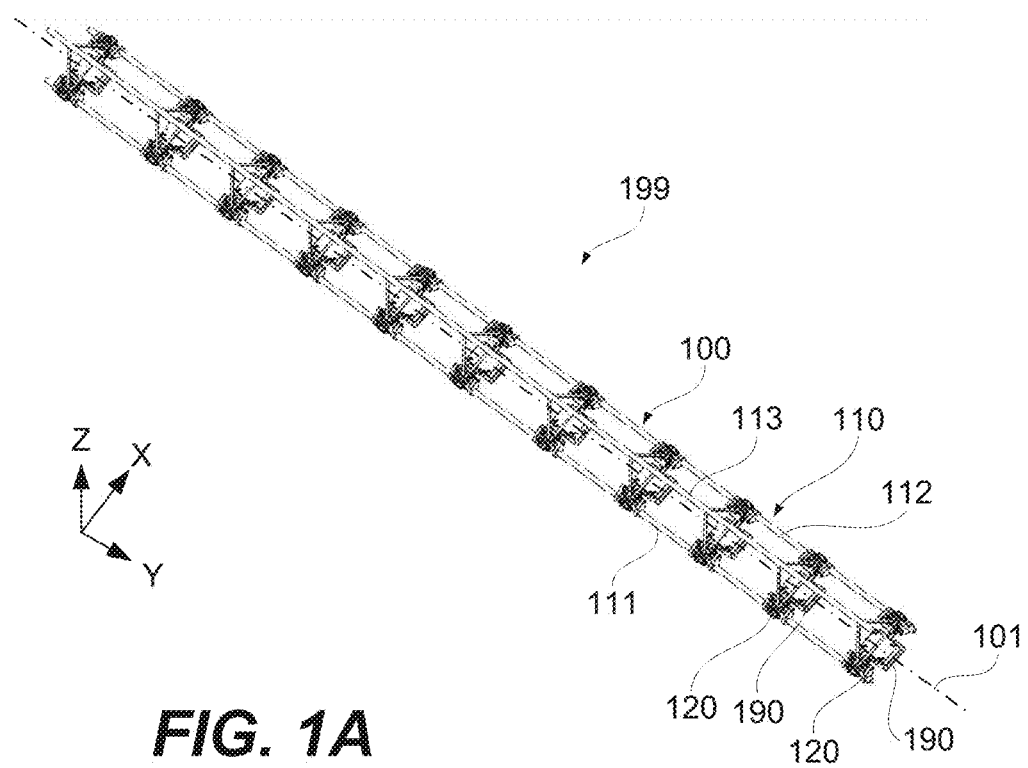
FIG. 1A is a schematic illustration of a flexible truss system, comprising a flexible truss mechanism and pick-and-place mechanisms, in accordance with some examples.

In the following description, numerous specific details are set forth in order to provide a thorough understanding of the presented concepts. In some examples, the presented concepts are practiced without some or all of these specific details. In other instances, well known process operations have not been described in detail so as to not unnecessarily obscure the described concepts. While some concepts will be described in conjunction with the specific examples, it will be understood that these examples are not intended to be limiting.

Introduction

As noted above, handling large and flexible parts can be challenging. Conventional approaches involve manual handling (e.g., using multiple operators) or custom tools (e.g., designed to conform to specific shapes). However, manual handling is time consuming and can damage parts (e.g., if operators' movements are not synchronized). Custom supporting tools are expensive and need to be specific to each type of part. At the same time, modern aircraft use many unique parts, which would require many individual supporting tools, resulting in complex logistic problems (e.g., retrieval, storage, and costs).

Flexible truss systems, described herein, are configured to change shapes to provide sufficient support to flexible composite parts, while these parts are being transferred or otherwise handled using these flexible truss systems. In particular, a flexible truss system comprises a flexible truss mechanism and composite pick-and-place mechanism, supported on the flexible truss mechanism. The composite pick-and-place mechanisms are configured to engage a flexible composite part during the part transfer. The flexible truss mechanism is configured to change the shape, e.g., to follow the shape of the flexible composite part. In some examples, the flexible composite part is an uncured composite part. One having ordinary skill in the art would recognize that uncured composite parts tend to be more flexible than cured counterparts. In some examples, a flexible composite part is at least 1 meter long or even at least 2 meters long or even 3 meters long. One having ordinary skill in the art would recognize that longer composite parts tend to have higher flexibility than corresponding shorter ones.

This shape change is used to ensure that the composite pick-and-place mechanisms come in contact and provide sufficient support to the flexible composite part at multiple different locations. This multi-location support is important during the transfer of flexible composite parts. In some examples, the flexible truss mechanism is configured to fix the new shape (e.g., maintain the shape during the transfer) to ensure the continuous support of the flexible composite part.

This ability to change the shape is provided by particular design and structural features of the flexible truss mechanism. Specifically, the flexible truss mechanism comprises flexible elongated members and slidable ribs. The slidable ribs are coupled to each flexible elongated member. More specifically, each rib is slidably coupled to at least one flexible elongated member. The flexibility of the elongated members and the ribs' ability to slide allow the flexible truss mechanism to bend and change the shape. In other words, the same flexible truss mechanism can be configured to support multiple different composite parts, which have different shapes.

Therefore, when the flexible truss mechanism is reconfigured to support a new composite part with a new shape, the ribs are able to slide relative to at least one flexible elongated member. This sliding action allows all flexible elongated members to bend and reshape. However, when the ribs are locked in place, relative to the flexible elongated members, the truss mechanism is able maintain the shape, e.g., during the transfer of flexible composite parts. The process of reconfiguring the flexible truss mechanism is repeatable. Hence, the same flexible truss mechanism can be used on a variety of different composite parts.

Examples of Flexible Truss Mechanisms and Systems

Figure 1B:
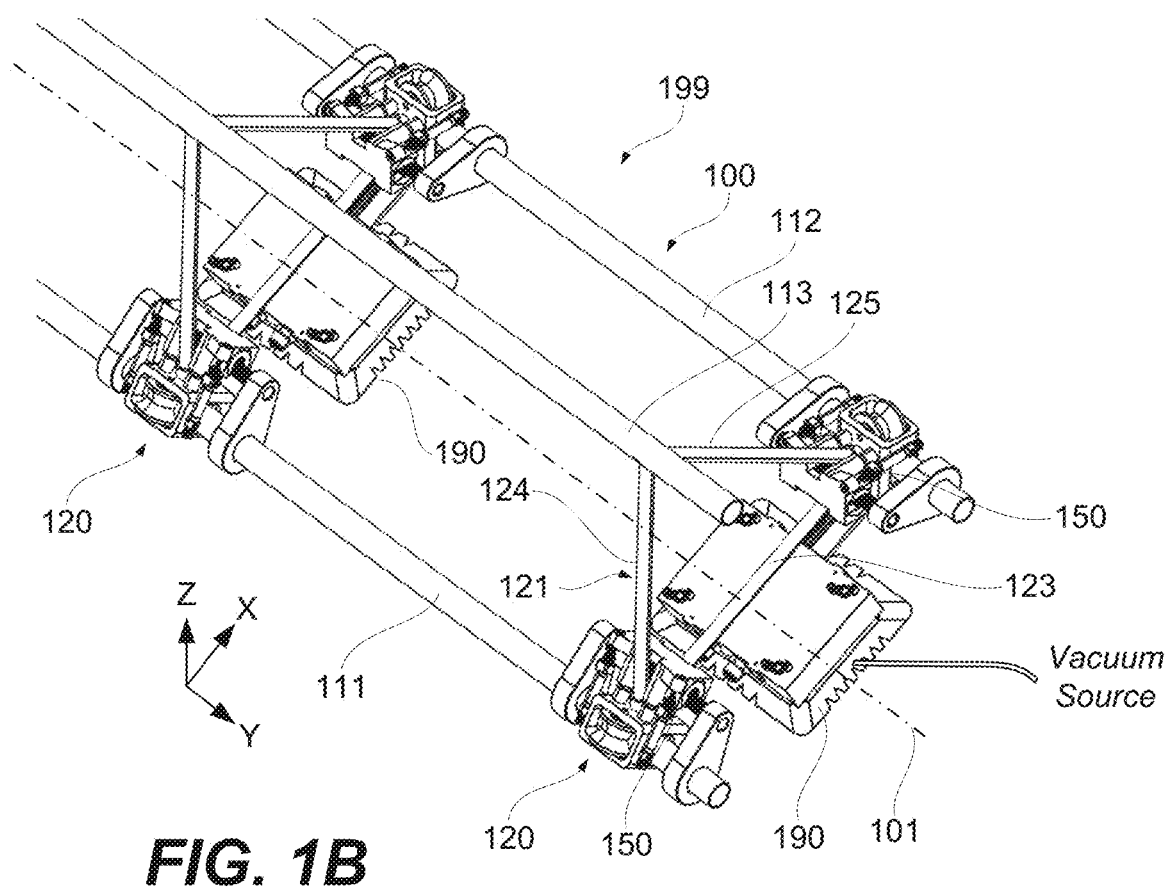
FIG. 1B is a schematic illustration of a portion of the flexible truss system in FIG. 1A, showing various details of the flexible truss mechanism and the composite pick-and-place mechanisms, in accordance with some examples.
Figure 1C:
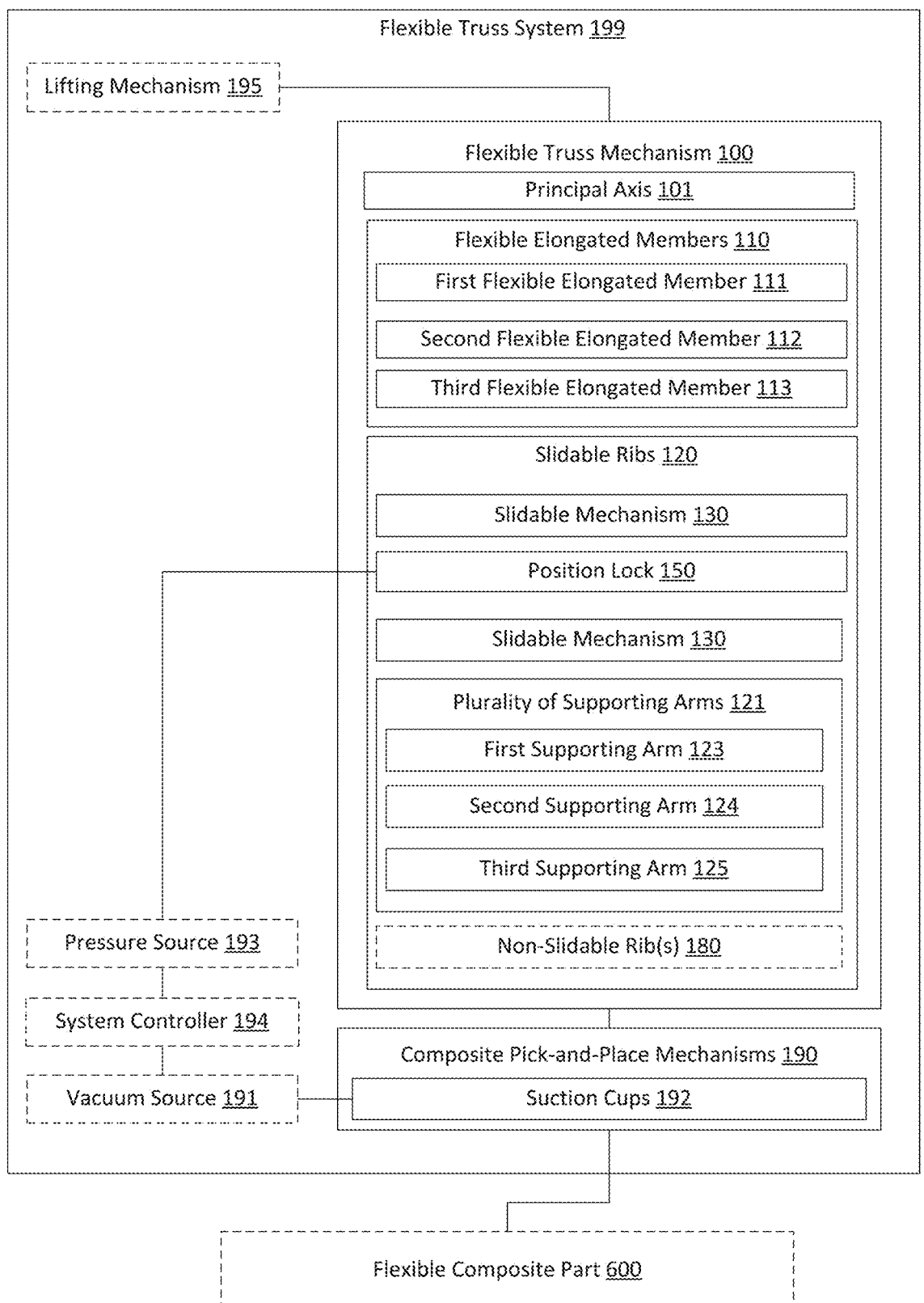
FIG. 1C is a block diagram representing a flexible truss system, in accordance with some examples.

FIG. 1A is a schematic perspective view of flexible truss system 199, comprising flexible truss mechanism 100 and pick-and-place mechanisms 190, in accordance with some examples. FIG. 1B is a schematic perspective view of a portion of flexible truss system 199 in FIG. 1A, illustrating additional features of flexible truss mechanism 100. Finally, FIG. 1C is a block diagram of flexible truss system 199, showing various other components of flexible truss system 199 as well as connections and relationship between these components, in accordance with some examples.

Pick-and-place mechanisms 190 are configured to support different flexible composite parts, various examples of which are listed above. Pick-and-place mechanisms 190 are attached and supported by flexible truss mechanism 100, as further described below. Referring to FIG. 1C, in some examples, composite pick-and-place mechanisms 190 comprise suction cups 192, which are controllably connected to vacuum source 191. The operation of vacuum source 191 and other components (e.g., pressure source 193 for actuating position locks 150) of flexible truss system 199 are controlled, in some examples, by system controller 194. In some examples, system controller 194 is communicatively coupled to pressure source 193 and configured to selectively connect and disconnect linear actuator 152 of position lock 150 of each of slidable ribs 120 from pressure source 193.

In some examples, flexible truss system 199 comprises lifting mechanism 195 for supporting flexible truss mechanism 100. Specifically, lifting mechanism 195 is used for particularly large and heavy flexible composite parts. In an example, lifting mechanism 195 is a robotic system including one or more robotic arms configured to support and move the flexible truss mechanism.

Figure 1D:
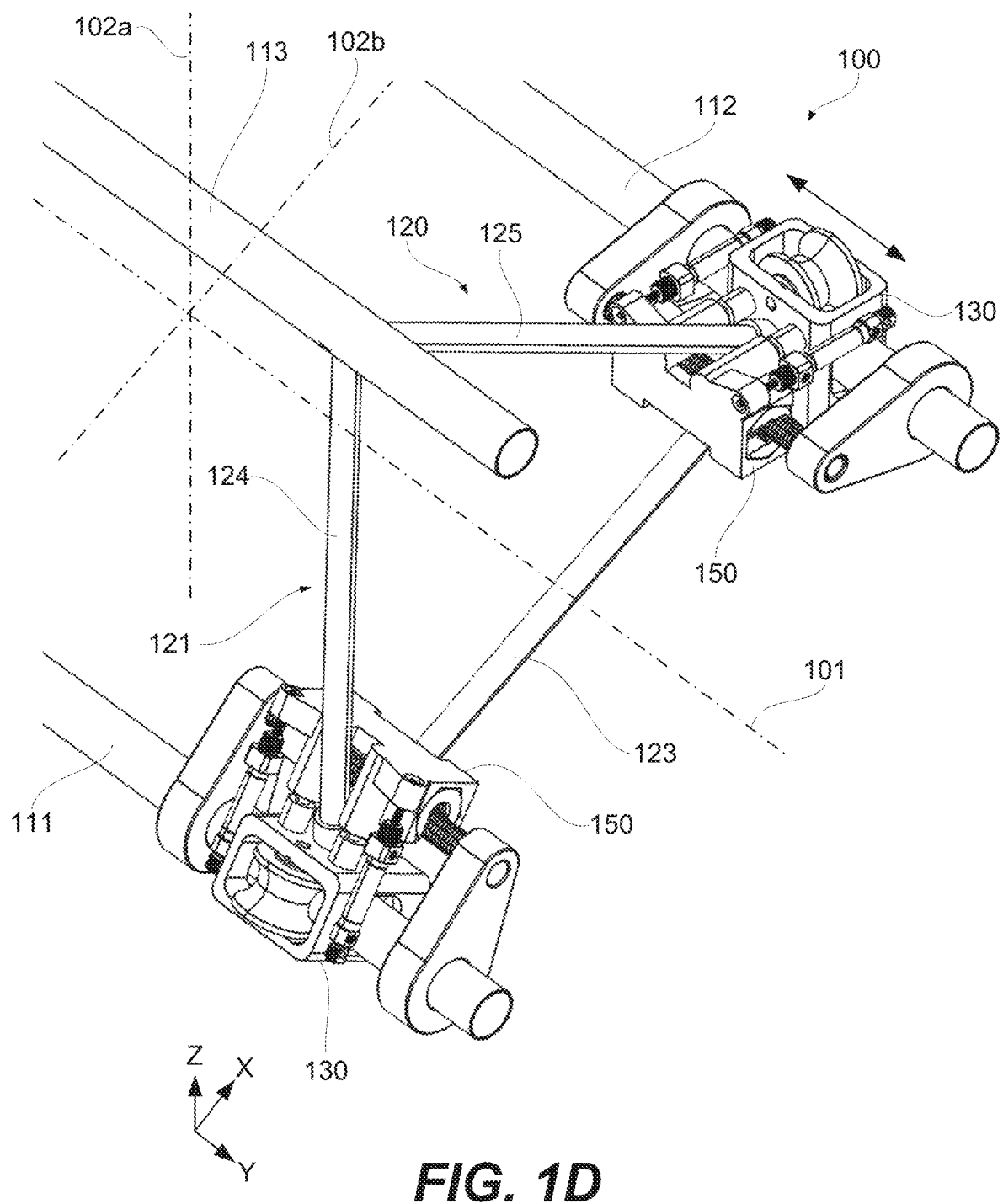
FIG. 1D is a schematic illustration of a portion of a flexible truss mechanism, in accordance with some examples.

In some examples, each one of slidable ribs 120 of flexible truss mechanism 100 supports a corresponding one of composite pick-and-place mechanisms 190. In other examples, flexible truss mechanism 100 comprises a plurality of slidable ribs where some of the slidable ribs have pick-and-place mechanism 190 attached to the ribs, while other slidable ribs do not have composite pick-and-place mechanism 190 attached to the ribs, e.g., free from any pick-and-place mechanisms. For instance, FIG. 1D illustrates an example flexible truss mechanism 100 having slidable rib 120 without a composite pick-and-place mechanism 190. In some examples, composite pick-and-place mechanisms 190 can be attached to every other slidable rib 120. In other examples, composite pick-and-place mechanisms 190 are attached at other intervals, including for instance at every third slidable rib 120 or every fourth slidable rib 120. As indicated above, in other examples, pick-and-place mechanisms 190 are attached to each slidable rib 190 of flexible truss mechanism 100 to form flexible truss system 199 as, e.g., shown in FIGS. 1A and 1B. In yet other examples, flexible truss mechanism 100 is used without pick-and-place mechanisms 190, e.g., to perform other operations not involving handling composite parts.

Referring to FIGS. 1A, 1B, and 1D, flexible truss mechanism 100 comprises flexible elongated members 110, extending along principal axis 101 of flexible truss mechanism 100. The figures illustrate three flexible elongated members 110, e.g., first flexible elongated member 111, second flexible elongated member 112, and third flexible elongated member 113. However, other numbers of flexible elongated members 110 are also within the scope, e.g., four, five, six, and so on. The number of flexible elongated members 110 determines the flexibility of flexible truss mechanism 100 and the support (e.g., to flexible composite parts) provided by flexible truss system 199. In some examples, each of flexible elongated members 110 is formed from carbon fiber. Carbon fiber has a low weight, is sufficiently flexible, and provides significant structural support, especially in the direction along principal axis 101. The length of flexible elongated members 110 (along principal axis 101) is determined by the length of the longest composite part that flexible truss system 199 is designed to support. In some examples, the length of flexible elongated members 110 is at least about 1 meter, at least about 2 meters, or even at least about 5 meters.

Referring to FIGS. 1A, 1B, and 1D, flexible truss mechanism 100 also comprises slidable ribs 120. Specifically, FIG. 1A illustrates eleven slidable ribs 120, positioned and spaced apart from each other along principal axis 101 between opposite ends of flexible elongated members 110. However, other numbers of ribs are also within the scope. Slidable ribs 120 are coupled to each of flexible elongated members 110 and support flexible elongated members 110 with respect to each other. Various examples of these couplings are described below.

Referring to FIGS. 1A and 1B, in some examples, slidable ribs 120 are configured to receive and support composite pick-and-place mechanisms 190. In more specific examples, each one of slidable ribs 120 supports a corresponding one of composite pick-and-place mechanisms 190 (e.g., composite pick-and-place mechanism 190 is attached to first supporting arm 123 of slidable rib 120). Alternatively, in other examples, at least one of slidable ribs 120 does not support any one of composite pick-and-place mechanisms 190, such as slidable rib 120 shown in FIG. 1D. Furthermore, in some examples, at least one of slidable ribs 120 supports multiple ones of composite pick-and-place mechanisms 190. In some examples, one or more composite pick-and-place mechanisms 190 are attached to one or more of flexible elongated members 110.

Referring to FIG. 1D, in some examples, each of slidable ribs 120 comprises a plurality of supporting arms 121. Each of plurality of supporting arms 121 defines, at least in part, a distance between a corresponding pair of flexible elongated members 110. For example, first supporting arm 123 extends between first flexible elongated member 111 and second flexible elongated member 112 or, more specifically, between sliding mechanisms 130, slidably coupled to first flexible elongated member 111 and second flexible elongated member 112. Second supporting arm 124 extends between first flexible elongated member 111 and third flexible elongated member 113. In the illustrated example, second supporting arm 124 is fixedly coupled directly to third flexible elongated member 113. Second supporting arm 124 is also connected to sliding mechanism 130, which is slidably coupled to first flexible elongated member 111. Finally, third supporting arm 125 extends between second flexible elongated member 112 and third flexible elongated member 113. In the illustrated example, third supporting arm 125 is fixedly coupled directly to third flexible elongated member 113. Third supporting arm 125 is also connected to sliding mechanism 130, which is slidably coupled to second flexible elongated member 112. Similarly, FIG. 1B illustrates slidable ribs 120, where each slidable rib 120 comprises a plurality of supporting arms 121 (in particular, first supporting arm 123, second supporting arm 124, and third supporting arm 125).

In some examples, the length of each of plurality of supporting arms 121 is same. As such, first flexible elongated member 111, second flexible elongated member 112, and third flexible elongated member 113 are positioned at the same distance from each other. Furthermore, in some examples, each of plurality of supporting arms 121 is straight. In some examples, supporting arms 121 are formed from a rigid material, such as aluminum.

Each slidable rib 120 is slidably coupled to at least one of flexible elongated members 110. For example, in this slidable coupling, the at least one of flexible elongated members 110 protrudes through each slidable rib 120. In some examples, each slidable rib 120 is slidably coupled to only one of flexible elongated members 110 and fixedly coupled to all remaining elongated members. Alternatively, each slidable rib 120 is slidably coupled to all but one of flexible elongated members 110 and fixedly coupled to the remaining elongated member. In some examples, each slidable rib 120 is slidably coupled to two of flexible elongated members 110 and fixedly coupled to one remaining elongated member. For example, FIGS. 1A and 1B illustrate an example where each slidable rib 120 is slidably coupled to each of first flexible elongated member 111 and second flexible elongated member 112. In the same example, each slidable rib 120 is fixedly coupled to third flexible elongated member 113. In some examples, each slidable rib 120 is slidably coupled all flexible elongated members 110. As noted above, the slidably coupling to at least one of flexible elongated members 110 allows flexible elongated members 110 to bend about one or more axes (e.g., axis 102a and axis 102b shown in FIG. 1D) perpendicular to principal axis 101. For instance, in some examples, principal axis 101 corresponds to the Y-axis, and the slidably coupling to at least one of flexible elongated members 110 allows flexible elongated members 110 to bend about one or more of axis 102b (corresponding to the X-axis) and axis 102a (corresponding to the Z-axis). This feature will now be described with reference to FIGS. 2A-2D.

Figure 2A:
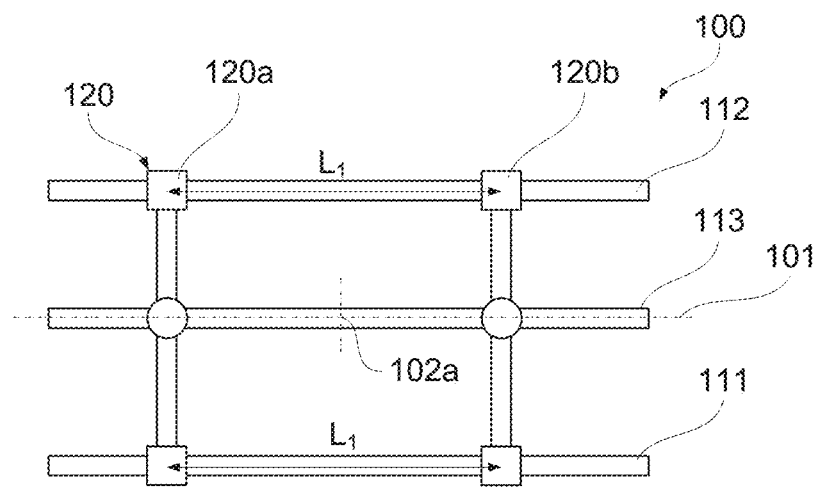
FIGS. 2A and 2B are schematic illustrations of a flexible truss mechanism comprising two slidable ribs, before (FIG. 2A) and after (FIG. 2B) bending, in accordance with some examples.
Figure 2A:
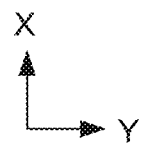
Figure 2B:
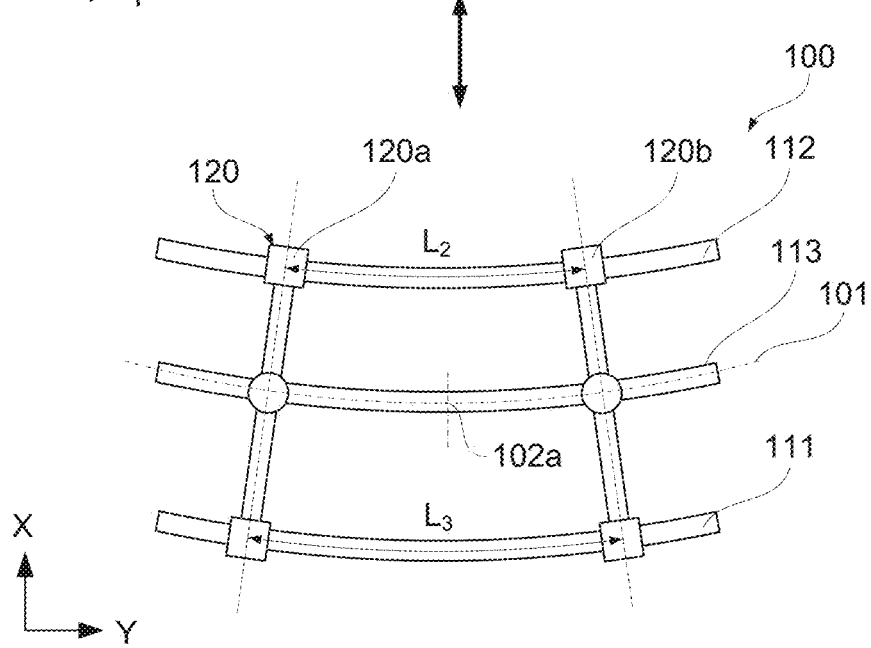
Figure 2B:
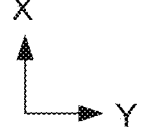

FIGS. 2A and 2B are schematic overhead views of flexible truss mechanism 100 comprising two slidable ribs 120, which may be referred to as first slidable rib 120a and second slidable rib 120b. Slidable rib 120a and second slidable rib 120b are slidably coupled to each of first flexible elongated member 111 and second flexible elongated member 112 and fixedly coupled to third flexible elongated member 113. FIG. 2A illustrates flexible truss mechanism 100 where each of first flexible elongated member 111, second flexible elongated member 112, and third flexible elongated member 113 is straight. Because third flexible elongated member 113 is fixedly coupled to each of first slidable rib 120a and second slidable rib 120b, the distance between connection points formed by these components (a first connection point between third flexible elongated member 113 and first slidable rib 120a and a second connection point between third flexible elongated member 113 and second slidable rib 120b) remain constant. These connection points, corresponding to fixed connections, are identified with circles in FIGS. 2A and 2B. However, the distance between connection points formed by first flexible elongated member 111 or second flexible elongated member 112 is adjustable. FIG. 2A identifies the distance between connection points formed by first flexible elongated member 111 (with first slidable rib 120a and second slidable rib 120b) to be $L_1$. FIG. 2A also identifies the distance between connection points formed by second flexible elongated member 112 (with first slidable rib 120a and second slidable rib 120b) to be $L_1$. These connection points, corresponding to slidable connections, are identified with squares in FIGS. 2A and 2B. In this example of FIG. 2A, these distances are the same since first flexible elongated member 111 and second flexible elongated member 112 are straight and since first slidable rib 120a and second slidable rib 120b are parallel to each other.

FIG. 2B illustrates flexible truss mechanism 100 where each of first flexible elongated member 111, second flexible elongated member 112, and third flexible elongated member 113 are bent, e.g., around axis 102a, which is perpendicular to principal axis 101 of flexible truss mechanism 100. The distance between connection points formed by third flexible elongated member 113 with each rib remains the same. However, the distance between connection points formed by first flexible elongated member 111 with each rib has reduced to $L_2$ such that $L_2<L_1$. On the other hand, the distance between connection points formed by second flexible elongated member 112 with each rib has increased to $L_3$ such that $L_3>L_1$. First flexible elongated member 111 and second flexible elongated member 112 are no longer straight. Furthermore, first slidable rib 120a and second slidable rib 120b are no longer parallel to each other. As such, flexible truss mechanism 100 is reconfigured to a new shape, e.g., corresponding to a particular flexible composite part. One having ordinary skill in the art would understand that this bending and non-parallel configuration of adjacent ribs may be achieved with one rib being fixedly attached to all flexible elongated members. Such a rib may be referred to as a fixed rib. In other words, flexible truss mechanism 100 is able to bend with one fixed rib and at least one slidable rib. However, multiple fixed ribs may interfere with bending of flexible truss mechanism 100. Additional features of fixed ribs will now be described with reference to FIGS. 2C and 2D.

Figure 2C:
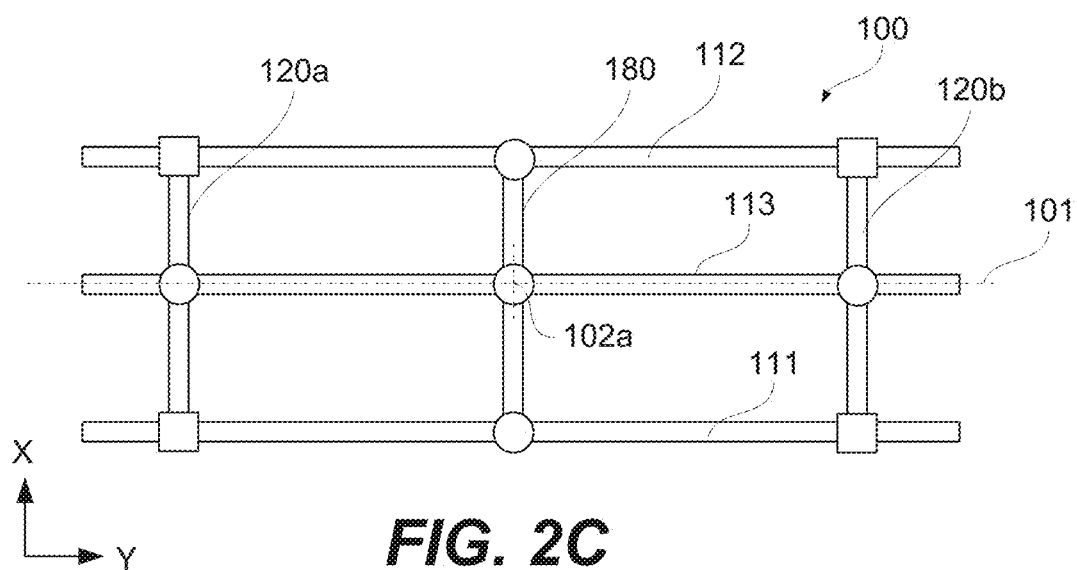
FIGS. 2C and 2D are schematic illustrations of another example of a flexible truss mechanism comprising two slidable ribs and one fixed rib, before (FIG. 2C) and after (FIG. 2D) bending.
Figure 2D:
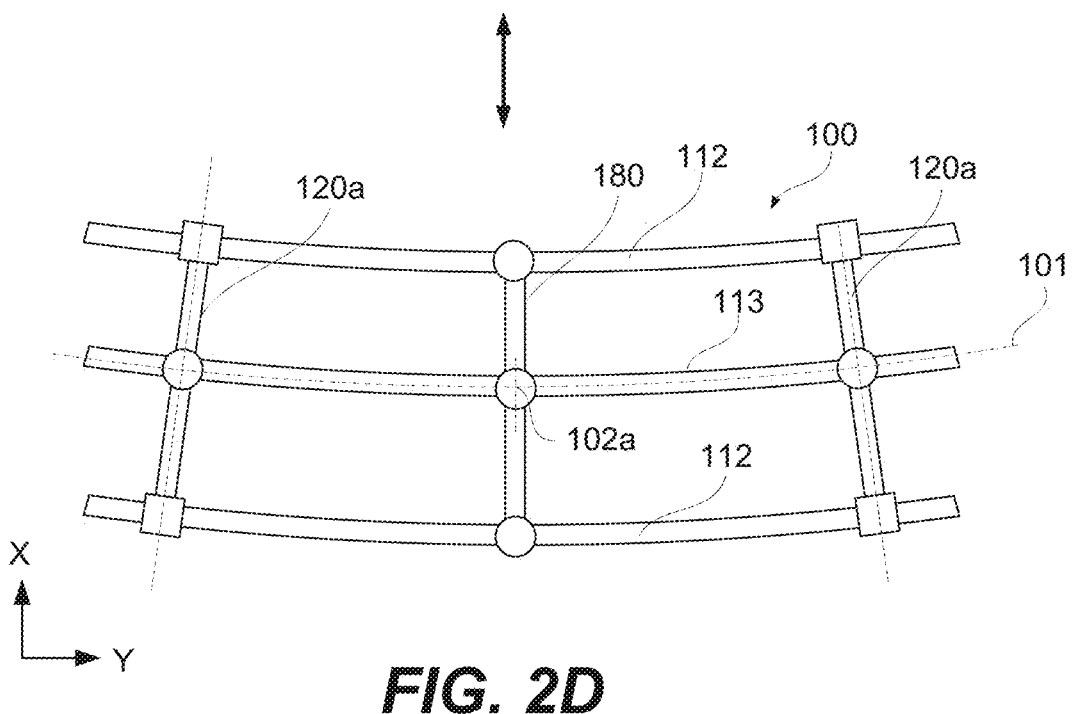

FIGS. 2C and 2D are schematic illustrations of another example of flexible truss mechanism 100 comprising first slidable rib 120a, second slidable rib 120b, and fixed rib 180. Similar to the example shown in FIGS. 2A and 2B and described above, first slidable rib 120a and second slidable rib 120b are slidably coupled to each of first flexible elongated member 111 and second flexible elongated member 112 and fixedly coupled to third flexible elongated member 113. However, fixed rib 180 is fixedly coupled to each of first flexible elongated member 111, second flexible elongated member 112, and third flexible elongated member 113. In FIG. 2C, all first flexible elongated member 111, second flexible elongated member 112, and third flexible elongated member 113 are straight. First slidable rib 120a, second slidable rib 120b, and fixed rib 180 are all parallel to each other.

FIG. 2D illustrates flexible truss mechanism 100 where each of first flexible elongated member 111, second flexible elongated member 112, and third flexible elongated member 113 are bent, e.g., around axis 102a, which is perpendicular to principal axis 101 of flexible truss mechanism 100. The distance between connection points formed by third flexible elongated member 113 with each rib remains the same. However, the distance between connection points formed by first flexible elongated member 111 with fixed rib 180 and each slidable rib has reduced. On the other hand, the distance between connection points formed by second flexible elongated member 112 with fixed rib 180 and each slidable rib has increased. First flexible elongated member 111 and second flexible elongated member 112 are no longer straight. First slidable rib 120a, fixed rib 180, and second slidable rib 120b are no longer parallel to each other. Other example locations of fixed rib 180 are possible as well. For instance, in an example, fixed rib 180 is disposed at one end of flexible truss system 100.

Figure 3A:
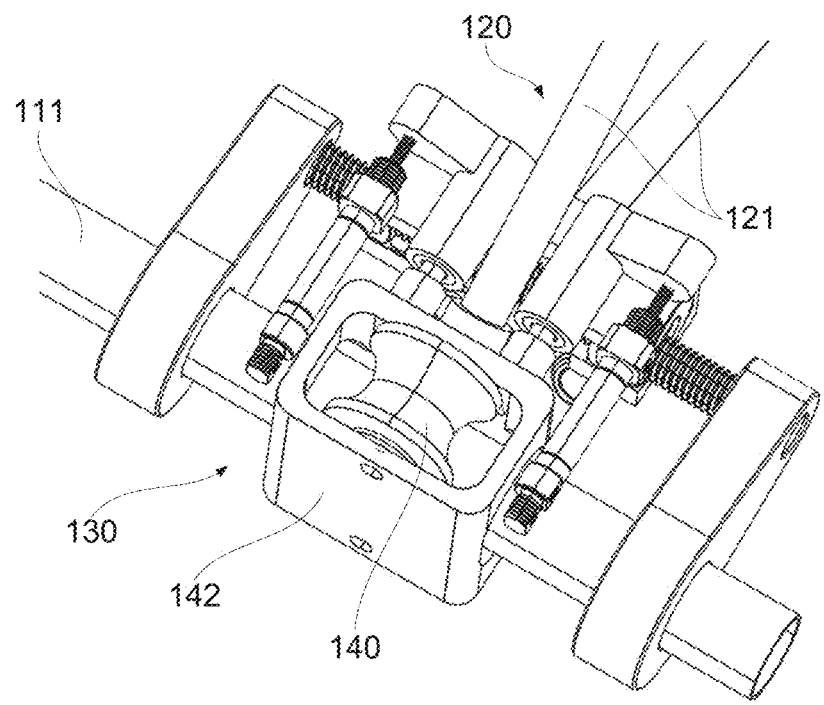
FIG. 3A is a schematic illustration of a sliding mechanism of a flexible truss mechanism, in accordance with some examples.
Figure 3B:
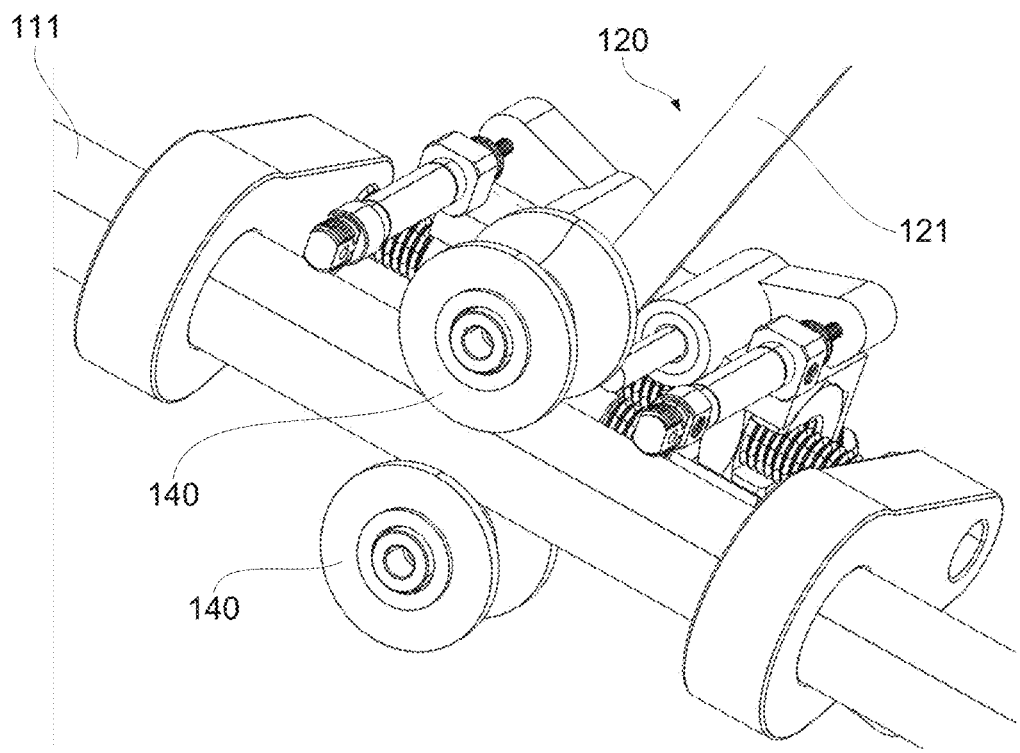
FIG. 3B is a schematic illustration of the sliding mechanism in FIG. 2B with a roller support removed, in accordance with some examples.

Referring to FIGS. 1D and 3A-3B, in some examples, each of slidable ribs 120 comprises one or more sliding mechanisms 130. The number of sliding mechanisms 130 depends on how many flexible elongated members 110 this particular slidable rib 120 is slidably coupled to. Briefly referring to an example of FIG. 1D, slidable rib 120 is slidably coupled to both first flexible elongated member 111 and second flexible elongated member 112. In this example, slidable rib 120 comprises two sliding mechanisms 130, with one slidably coupling the rib to first flexible elongated member 111 and another one slidably coupling the rib to second flexible elongated member 112. In other words, each slidable rib 120 comprises one sliding mechanism 130 for each flexible elongated member 110, slidable relative to slidable ribs 120. Sliding mechanism 130 provides the slidable coupling between the rib and the corresponding flexible elongated member.

Referring to FIGS. 3A-3B, in some examples, sliding mechanism 130 comprises one or more rollers 140, rollably engaging at least one of flexible elongated members 110 (e.g., first flexible elongated member 111 shown in FIGS. 3A-3B). For example, sliding mechanism 130 comprises two rollers 140 such that first flexible elongated member 111 is positioned between these two rollers 140. The two rollers 140 are supported with roller support 142, which is attached to supporting arms 121 of slidable rib 120. FIG. 3B shows slidable rib 120 with roller support 142 removed to illustrate the relative position of rollers 140 and first flexible elongated member 111.

While sliding of ribs relative to flexible elongated members allows bending of flexible truss mechanism 100, e.g., to follow the shape of a new composite part, fixing the ribs relative to the flexible elongated members allows preserving the new shape of flexible truss mechanism 100 while, e.g., transferring the new composite part. Position locks 150 are used for this purpose, which will now be described with reference to FIGS. 4A-4C.

Referring to FIGS. 11, 1D and 4A, in some examples, each of slidable ribs 120 comprises one or more position locks 150. Similar to sliding mechanisms 130, the number of position locks 150 depends on how many flexible elongated members 110 this particular slidable rib 120 is slidably coupled to. Briefly referring to an example of FIG. 1D, slidable rib 120 is slidably coupled to both first flexible elongated member 111 and second flexible elongated member 112. In this example, slidable rib 120 comprises two position locks 150, one for maintaining the position of slidable rib 120 relative to first flexible elongated member 111 and another for maintaining the position of slidable rib 120 relative to second flexible elongated member 112. In other words, each slidable rib 120 comprises one position lock 150 for each flexible elongated member 110, slidable relative to slidable ribs 120.

Position lock 150 is configured to lock the corresponding slidable rib 120, which position lock 150 is a part of, in a set position. The fixed position is relative to flexible elongated member 110, which this slidable rib 120 is slidably coupled to. For example, position lock 150 is switchable between a locked position and an unlocked position. When position lock 150 is in the locked position, position lock 150 prevents slidable rib 120 from sliding relative to the corresponding flexible elongated member 110. When position lock 150 is in the unlocked position, position lock 150 allows slidable rib 120 to slide relative to the corresponding flexible elongated member 110.

Referring to FIG. 4A, in some examples, position lock 150 comprises linear actuator 152, cutout nut 154, and threaded position shaft 156. Threaded position shaft 156 is fixedly connected to at least one of flexible elongated members 110, e.g., first flexible elongated member 111 shown in FIG. 4A. This fixed connection is provided, e.g., using position limiters 160, fixedly connecting the end of threaded position shaft 156 to first flexible elongated member 111. Linear actuator 152 is coupled to cutout nut 154 and configured to move cutout nut 154 relative to threaded position shaft 156 between a shaft-engaging position and a shaft-disengaging position. In some examples, linear actuator 152 is a pneumatic cylinder.

FIG. 4B illustrates the shaft engaging position, which corresponds to the locked position of position lock 150. In this position, cutout nut 154 engages threaded position shaft 156 (e.g., threads of cutout nut 154 interlock with threads of threaded position shaft 156 thereby preventing cutout nut 154 from sliding along threaded position shaft 156). Due to the fixed connection between threaded position shaft 156 and flexible elongated members 110 as well as the connection between cutout nut 154 and other components of slidable rib 120 (shown in FIG. 4B), slidable rib 120 is not able to slide relative to first flexible elongated member 111.

FIG. 4C illustrates the shaft disengaging position, which corresponds to the unlocked position of position lock 150. In this position, cutout nut 154 is moved away from threaded position shaft 156, thereby allowing cutout nut 154 to slide along threaded position shaft 156 (e.g., along the direction parallel to threaded position shaft 156). As a result, slidable rib 120 is also able to slide relative to first flexible elongated member 111.

Examples of Methods for Transferring Flexible Composite Parts

Figure 5:
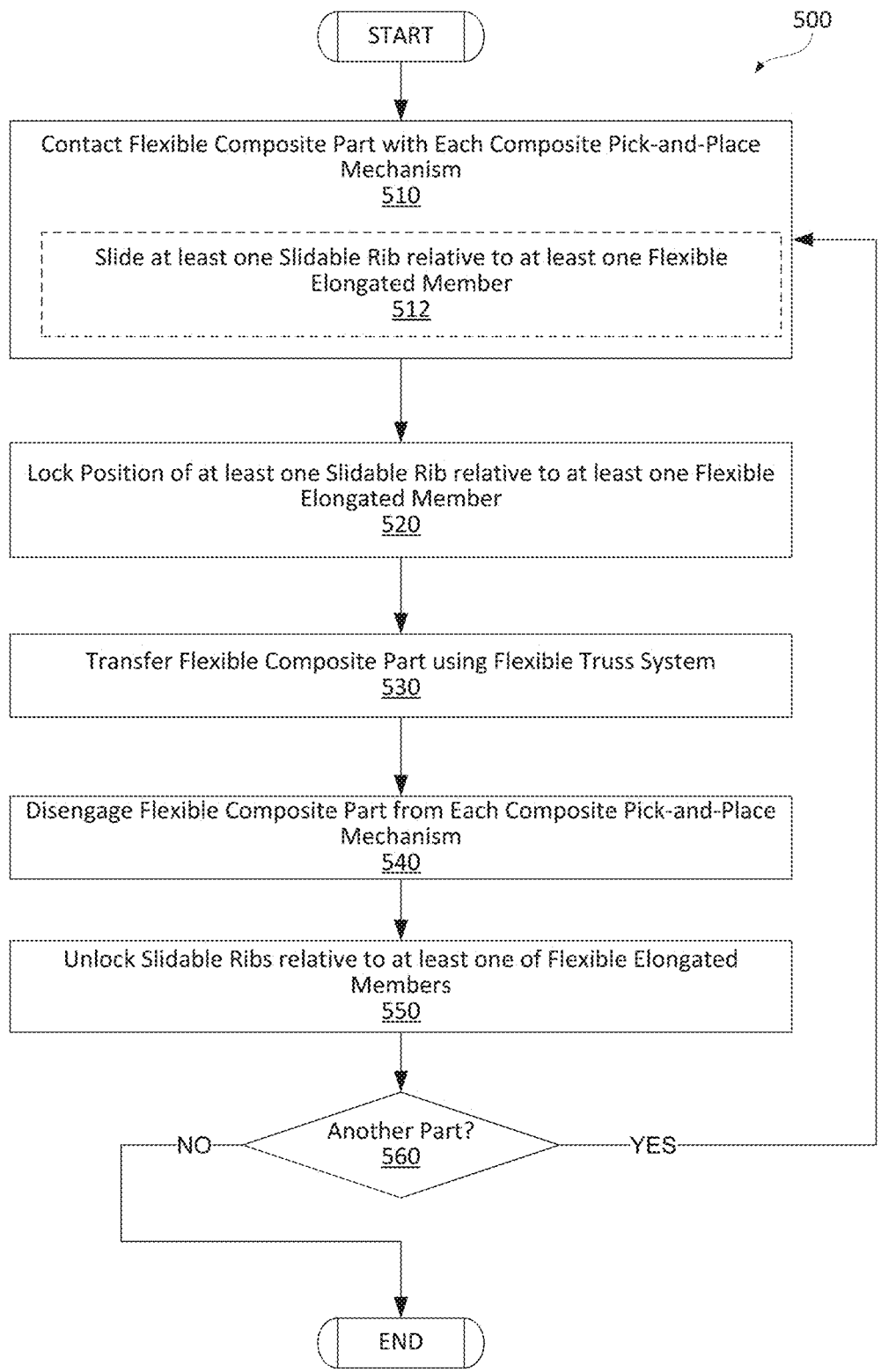
FIG. 5 is a process flowchart corresponding to a method of transferring a flexible composite part using a flexible truss system, in accordance with some examples.

FIG. 5 is a process flowchart corresponding to method 500 of transferring flexible composite part 600 using flexible truss system 199, in accordance with some examples. Various features of flexible truss system 199, which comprises flexible truss mechanism 100 and pick-and-place mechanisms 190, are described above.

In some examples, method 500 comprises contacting (block 510) flexible composite part 600 with each of pick-and-place mechanisms 190. Pick-and-place mechanisms 190 are supported on flexible truss mechanism 100 and distributed along principal axis 101 of flexible truss mechanism 100. As described above with references to FIG. 1A-FIG. 4, flexible truss mechanism 100 comprises flexible elongated members 110 and slidable ribs 120. Slidable ribs 120 are coupled to each of flexible elongated members 110 and support flexible elongated members 110 with respect to each other. Furthermore, in some examples, composite pick-and-place mechanisms 190 are attached to or otherwise supported by slidable ribs 120.

In some examples, contacting (block 510) flexible composite part 600 with each of pick-and-place mechanisms 190 comprises sliding (block 512) at least one of slidable ribs 120 relative to at least one of flexible elongated members 110 as described above with referenced to FIGS. 2A-2D. This feature allows flexible elongated members 110 to bend, which in turn allows each of pick-and-place mechanisms 190 to contact flexible composite part 600.

Figure 6A:
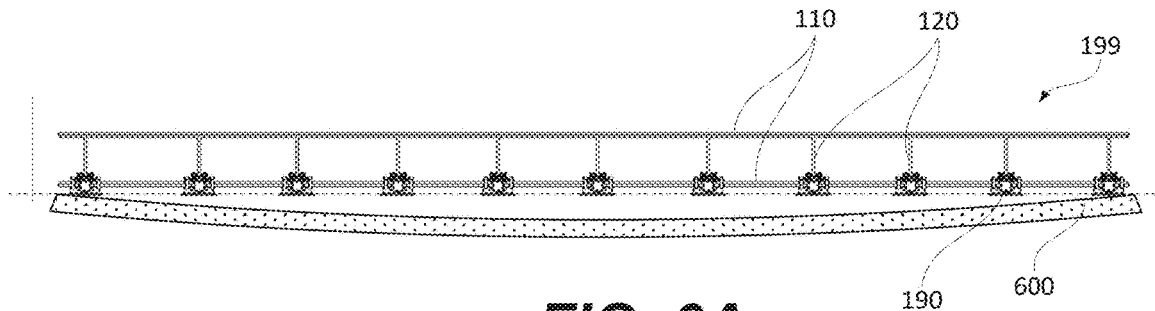
FIG. 6A is a schematic illustration of a flexible truss system positioned over a flexible composite part prior to conforming the shape of the flexible truss system to the flexible composite part, in accordance with some examples.

For example, FIG. 6A illustrates flexible truss system 199 with straight, flexible elongated members 110. As a result, composite pick-and-place mechanisms 190 are aligned along a straight line (shown as a dashed line in FIG. 6A). However, in this example, flexible composite part 600 is not straight and many of composite pick-and-place mechanisms 190 are not able to contact flexible composite part 600. Without being contacted by a sufficient number of composite pick-and-place mechanisms 190, flexible composite part 600 is not sufficiently supported, e.g., due to being flexible. The number, spacing, and other characteristics of composite pick-and-place mechanisms 190 are determined based on the type of flexible composite part 600 (e.g., size, weight, curing state, and the like).

Figure 6B:
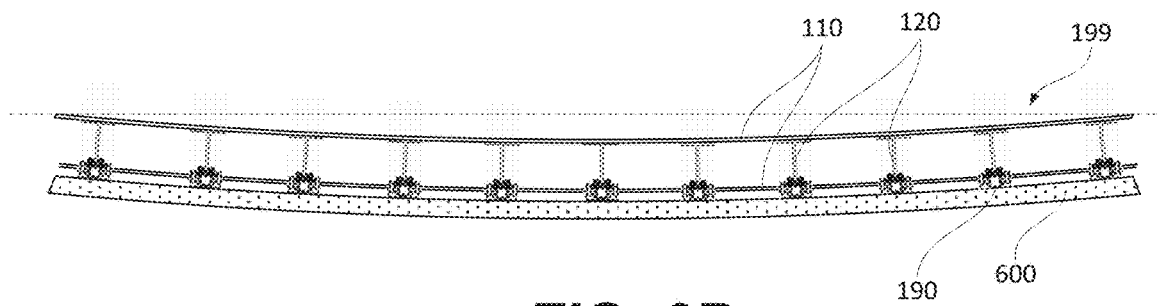
FIG. 6B is a schematic illustration of a flexible truss system positioned over a flexible composite part after conforming the shape of the flexible truss system to the flexible composite part, in accordance with some examples.

FIG. 6B illustrates flexible elongated members 110 after sliding at least one of slidable ribs 120 relative to at least one of flexible elongated members 110 and bending flexible elongated members 110 (relative to FIG. 6B). In this illustration, composite pick-and-place mechanisms 190 are all in contact with flexible composite part 600, providing sufficient support to flexible composite part 600.

In some examples, method 500 proceeds with locking (block 520) the position of at least one of slidable ribs 120 relative to at least one of flexible elongated members 110, e.g., using position locks 150, described above with reference to FIGS. 4A-4C. In more specific examples, all slidable ribs 120 are locked relative to each flexible elongated member 110. It should be noted that in some examples, one or more flexible elongated members 110 are fixedly attached to slidable ribs 120. This locking/fixed attachment preserves the shape of flexible elongated members 110. As a result, the contact between each of pick-and-place mechanisms 190 and flexible composite part 600 is maintained, e.g., as shown in FIG. 6B.

In some examples, method 500 proceeds with transferring (block 530) flexible composite part 600 using flexible truss system 199 while maintaining contact between each of pick-and-place mechanisms 190 and flexible composite part 600. For example, composite part 600 is transferred, using flexible truss system 199, between various processing, e.g., between forming flexible composite part 600 and curing flexible composite part 600. For example, an assembly of flexible composite part 600 using flexible truss system 199 is handled manually or using lifting mechanism 195. It should be noted that flexible composite part 600 is supported by flexible truss system 199 during this operation.

In some examples, method 500 proceeds with disengaging (block 540) flexible composite part 600 from each of pick-and-place mechanisms 190. For example, the vacuum applied to suction cups 192, used as pick-and-place mechanisms 190, is released, thereby allowing separation of suction cups 192 from flexible composite part 600.

In some examples, method 500 proceeds with unlocking (block 550) the positions of slidable ribs 120 relative to the at least one of flexible elongated members 110. It should be noted that while pick-and-place mechanisms 190 engage and support flexible composite part 600, slidable ribs 120 are locked relative to the at least one of flexible elongated members 110 to preserve the shape of flexible truss system 199. However, in order to reconfigure flexible truss system 199 (e.g., to support additional flexible composite part 610, which has a different shape), the positions of slidable ribs 120 are unlocked.

Figure 6C:
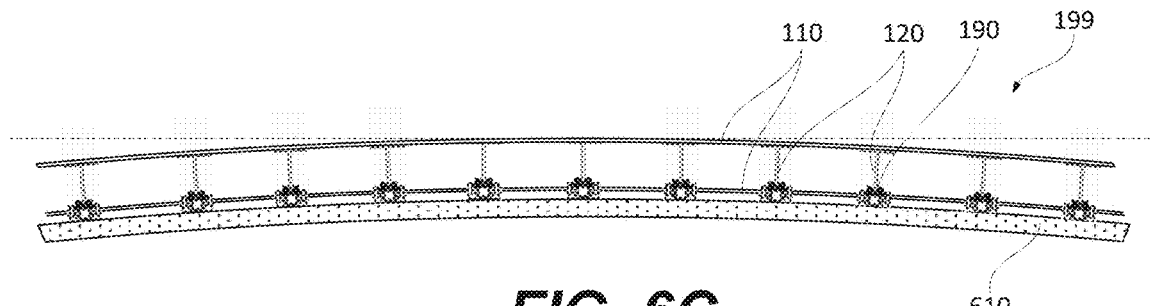
FIG. 6C is a schematic illustration of a flexible truss system positioned over another flexible composite part after conforming the shape of the flexible truss system to this other flexible composite part, in accordance with some examples.

In some examples and with reference to decision block 560 in FIG. 5, method 500 proceeds with transferring another flexible composite part (e.g., shown in FIG. 6C) using the same flexible truss system 199. In this case, various operations described above with reference to blocks 510-550 are repeated. For examples, method 500 proceeds with contacting (block 510) additional flexible composite part 610 with each of pick-and-place mechanisms 190, supported on flexible truss mechanism 100. This contacting operation (of additional flexible composite part 610) comprises sliding (block 512) at least one of slidable ribs 120 relative to at least one of flexible elongated members 110. This sliding allows flexible elongated members 110 to bend and allows each of pick-and-place mechanisms 190 to form contact with additional flexible composite part 610. As shown in FIGS. 6B and 6C, additional flexible composite part 610 and flexible composite part 600 have different shapes. As such, flexible truss system 199 is reconfigured during this operation to match the shape of additional flexible composite part 610.

In some examples, method 500 further comprises locking (block 520) slidable ribs 120 relative to at least one of flexible elongated members 110 in additional set positions. This locking preserves the shape of flexible elongated members 110 (now matching additional flexible composite part 610) and maintains contact between each of pick-and-place mechanisms 190 and additional flexible composite part 610. These additional set positions are different from the set positions, used before for flexible composite part 600.

AIRCRAFT EXAMPLES

In some examples, methods and systems described above are used on aircraft and, more generally, by the aerospace industry. Specifically, these methods and systems can be used during fabrication of aircraft as well as during aircraft service and maintenance.

Figure 7:
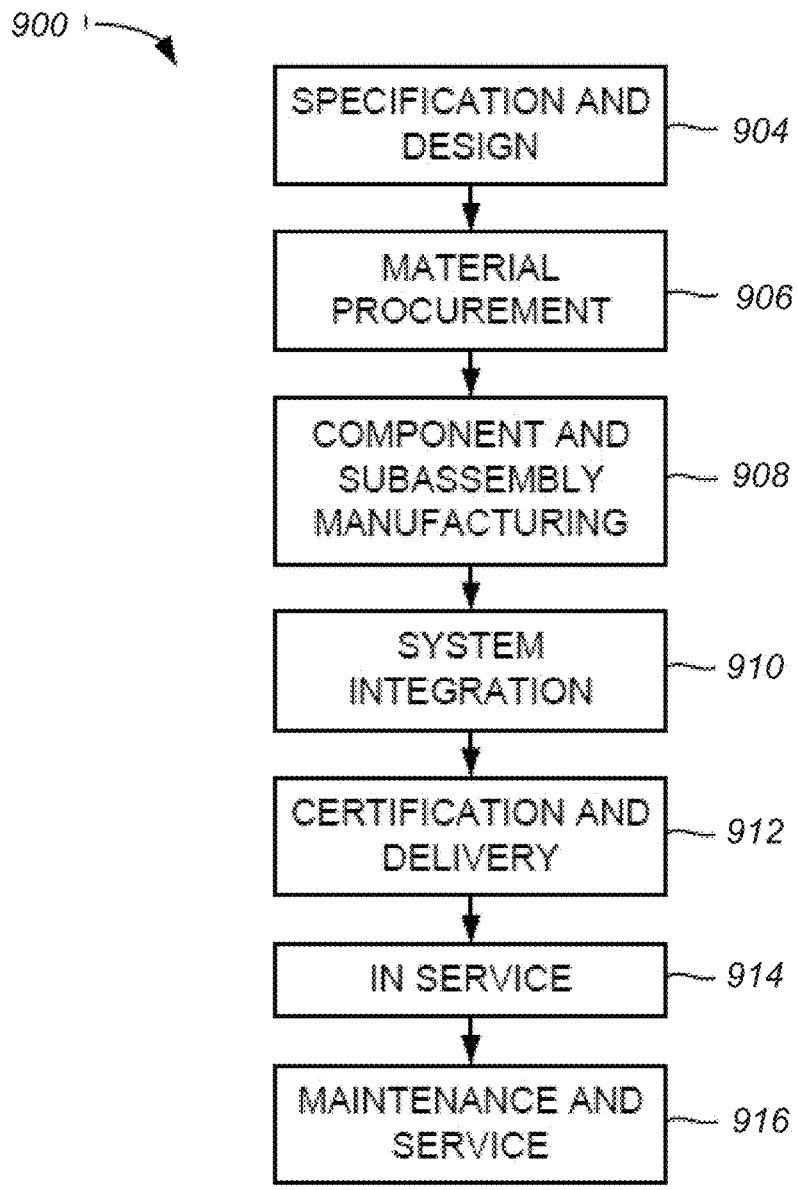
FIG. 7 is a process flowchart corresponding to a method for manufacturing and servicing the aircraft.
Figure 8:
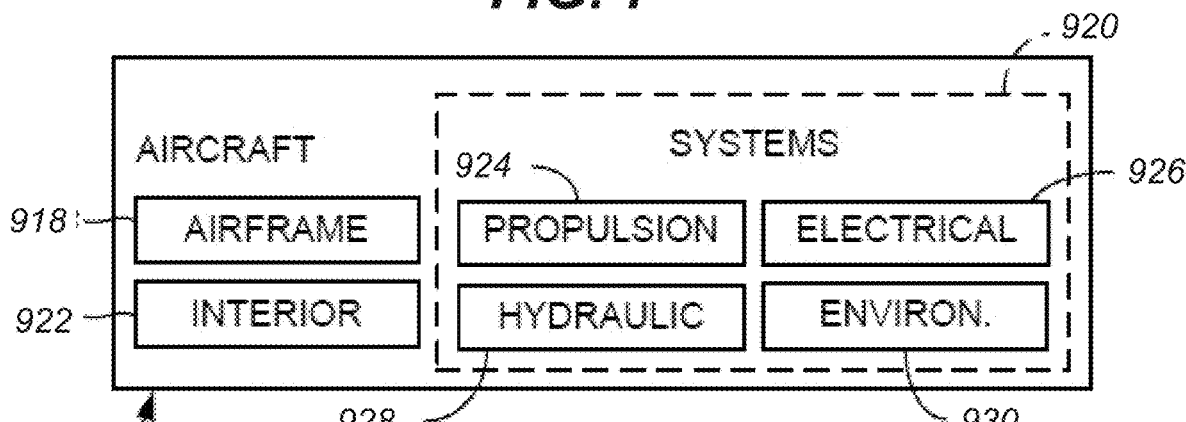
FIG. 8 illustrates a block diagram of an example aircraft, in accordance with some examples.

Accordingly, the apparatus and methods described above are applicable for aircraft manufacturing and service method 900 as shown in FIG. 7 and for aircraft 902 as shown in FIG. 8. During pre-production, method 900 includes specification and design 904 of aircraft 902 and material procurement 906. During production, component and subassembly manufacturing 908 and system integration 910 of aircraft 902 takes place. Thereafter, aircraft 902 goes through certification and delivery 912 in order to be placed in service 914. While in service by a customer, aircraft 902 is scheduled for routine maintenance and service 916, which also includes modification, reconfiguration, refurbishment, and so on.

In some examples, each of the processes of method 900 is performed or carried out by a system integrator, a third party, and/or an operator, e.g., a customer. For the purposes of this description, a system integrator includes without limitation any number of aircraft manufacturers and major-system subcontractors; a third party includes without limitation any number of venders, subcontractors, and suppliers; and an operator can be an airline, leasing company, military entity, service organization, and so on.

As shown in FIG. 8, aircraft 902 produced by method 900 includes airframe 918 with plurality of systems 920 and interior 922. Examples of systems 920 include one or more of propulsion system 924, electrical system 926, hydraulic system 928, and environmental system 930. Any number of other systems can be included. Although an aerospace example is shown, the principles of the examples described herein is applied to other industries, such as the automotive industry.

Apparatus and methods presented herein can be employed during any one or more of the stages of method 900. For example, components or subassemblies corresponding to manufacturing 908 are fabricated or manufactured in a manner similar to components or subassemblies produced while aircraft 902 is in service. Also, one or more apparatus examples, method examples, or a combination thereof is utilized during manufacturing 908 and system integration 910, for example, by substantially expediting assembly of or reducing the cost of an aircraft 902. Similarly, one or more of apparatus examples, method examples, or a combination thereof is utilized while aircraft 902 is in service, for example and without limitation, to maintenance and service 916.

FURTHER EXAMPLES

Further, description includes examples according to following clauses:

Clause 1. A flexible truss mechanism comprising:

flexible elongated members, extending along a principal axis of the flexible truss mechanism;

slidable ribs, coupled to each of the flexible elongated members and supporting the flexible elongated members with respect to each other, wherein:

the slidable ribs are spaced apart from each other along the principal axis of the flexible truss mechanism;

the slidable ribs are configured to receive and support one or more composite pick-and-place mechanisms; and each of the slidable ribs is slidably coupled to at least one of the flexible elongated members, thereby allowing each of the slidable ribs to slide relative to the at least one of the flexible elongated members along the principal axis and allowing the flexible elongated members to bend about at least one axis, perpendicular to the principal axis.

Clause 2. The flexible truss mechanism of clause 1, wherein:

each of the slidable ribs comprises a position lock, for each of the flexible elongated members, slidable relative to the slidable ribs; and the position lock is configured to lock a corresponding one of the slidable ribs in a set position, relative to the at least one of the flexible elongated members.

Clause 3. The flexible truss mechanism of clause 2, wherein:

the position lock is switchable between a locked position and an unlocked position;

when the position lock is in the locked position, the position lock prevents the corresponding one of the slidable ribs from sliding relative to the at least one of the flexible elongated members; and when the position lock is in the unlocked position, the position lock allows the corresponding one of the slidable ribs to slide relative to the at least one of the flexible elongated members.

Clause 4. The flexible truss mechanism of clause 3, wherein:

the position lock comprises a linear actuator, a cutout nut, and a threaded position shaft, fixedly connected to the at least one of the flexible elongated members;

the linear actuator is coupled to the cutout nut and configured to move the cutout nut relative to the threaded position shaft between a shaft-engaging position and a shaft-disengaging position;

the shaft-engaging position corresponds to the locked position of the position lock; and the shaft-disengaging position corresponds to the unlocked position of the position lock.

Clause 5. The flexible truss mechanism of clause 4, wherein the linear actuator is a pneumatic cylinder.

Clause 6. The flexible truss mechanism of clause 5, wherein each of the slidable ribs is fixedly coupled to at least another one of the flexible elongated members.

Clause 7. The flexible truss mechanism of any one of clauses 1-6, wherein each of the slidable ribs is slidably coupled to at least two of the flexible elongated members, thereby allowing each of the slidable ribs to slide relative to the at least two of the flexible elongated members along the principal axis.

Clause 8. The flexible truss mechanism of any one of clauses 1-7, wherein each of the slidable ribs is slidably coupled to all of the flexible elongated members, thereby allowing each of the slidable ribs to slide relative to all of the flexible elongated members along the principal axis.

Clause 9. The flexible truss mechanism of any one of clauses 1-8, wherein:

each of the slidable ribs comprises a sliding mechanism for each of the flexible elongated members, slidable relative to the slidable ribs; and the sliding mechanism comprises one or more rollers, rollably engaging the at least one of the flexible elongated members.

Clause 10. The flexible truss mechanism of any one of clauses 1-9, wherein each of the slidable ribs comprises a plurality of supporting arms, wherein each of the plurality of supporting arms defines, at least in part, a distance between a corresponding pair of the flexible elongated members.

Clause 11. The flexible truss mechanism of clause 10, wherein a length of each of the plurality of supporting arms is same.

Clause 12. The flexible truss mechanism of clause 10, wherein each of the plurality of supporting arms is straight.

Clause 13. The flexible truss mechanism of any one of clauses 1-12, wherein each of the flexible elongated members is formed from carbon fiber.

Clause 14. The flexible truss mechanism of any one of clauses 1-13, wherein each of the flexible elongated members protrudes through each of the slidable ribs.

Clause 15. The flexible truss mechanism of any one of clauses 1-14, further comprising a fixed rib, fixedly coupled to each of the flexible elongated members.

Clause 16. A flexible truss system comprising:

a flexible truss mechanism, comprising flexible elongated members, extending along a principal axis of the flexible truss mechanism, and slidable ribs, coupled to each of the flexible elongated members; and pick-and-place mechanisms, wherein:

each of the pick-and-place mechanisms is supported by a corresponding one of the slidable ribs; and each of the slidable ribs is slidably coupled to at least one of the flexible elongated members, thereby allowing each of the slidable ribs to slide relative to the at least one of the flexible elongated members along the principal axis and allowing the flexible elongated members to bend about at least one axis, perpendicular to the principal axis.

Clause 17. The flexible truss system of clause 16, further comprising a vacuum source, wherein each of the pick-and-place mechanisms comprises a suction cup, configured to be controllably connected to the vacuum source.

Clause 18. The flexible truss system of any one of clauses 16-17, wherein:

each of the slidable ribs comprises a position lock, for each of the flexible elongated members, slidable relative to the slidable ribs; and the position lock is configured to lock a corresponding one of the slidable ribs in a set position, relative to the at least one of the flexible elongated members.

Clause 19. The flexible truss system of clause 18, wherein:

the position lock is switchable between a locked position and an unlocked position; when the position lock is in the locked position, the position lock prevents the corresponding one of the slidable ribs from sliding relative to the at least one of the flexible elongated members; and when the position lock is in the unlocked position, the position lock allows the corresponding one of the slidable ribs to slide relative to the at least one of the flexible elongated members.

Clause 20. The flexible truss system of clause 19, wherein:

the position lock comprises a linear actuator, a cutout nut, and a threaded position shaft, fixedly connected to the at least one of the flexible elongated members;

the linear actuator is coupled to the cutout nut and configured to move the cutout nut relative to the threaded position shaft between a shaft-engaging position and a shaft-disengaging position;

the shaft-engaging position corresponds to the locked position of the position lock; and the shaft-disengaging position corresponds to the unlocked position of the position lock.

Clause 21. The flexible truss system of clause 20, further comprising a pressure source, wherein the linear actuator of the position lock of each of the slidable ribs is a pneumatic cylinder, controllably coupled to the pressure source.

Clause 22. The flexible truss system of clause 21, further comprising a system controller, communicatively coupled to the pressure source and configured to selectively connect and disconnect the linear actuator of the position lock of each of the slidable ribs from the pressure source.

Clause 23. A method of transferring a flexible composite part using a flexible truss system comprising a flexible truss mechanism and pick-and-place mechanisms, the method comprising:

contacting the flexible composite part with each of the pick-and-place mechanisms, supported on the flexible truss mechanism, wherein:

the flexible truss mechanism comprises flexible elongated members and slidable ribs, coupled to each of the flexible elongated members and supporting the flexible elongated members with respect to each other; and contacting the flexible composite part comprises sliding at least one of the slidable ribs relative to at least one of the flexible elongated members, thereby allowing the flexible elongated members to bend and allowing each of the pick-and-place mechanisms to form contact with the flexible composite part; and locking the slidable ribs relative to the at least one of the flexible elongated members in set positions, thereby preserving shape of the flexible elongated members and maintaining the contact between each of the pick-and-place mechanisms and the flexible composite part; and transferring the flexible composite part using the flexible truss system while maintaining the contact between each of the pick-and-place mechanisms and the flexible composite part.

Clause 24. The method of clause 23, further comprising:
disengaging the flexible composite part from each of the pick-and-place mechanisms; and
unlocking the positions of the slidable ribs relative to the at least one of the flexible elongated members.

Clause 25. The method of any clauses 23-24, further comprising:
contacting an additional flexible composite part with each of the pick-and-place mechanisms, supported on the flexible truss mechanism, wherein:
contacting the additional flexible composite part comprises sliding at least one of the slidable ribs relative to at least one of the flexible elongated members, thereby allowing the flexible elongated members to bend and allowing each of the pick-and-place mechanisms to form contact with the additional flexible composite part; and
the additional flexible composite part and the flexible composite part have different shapes.

Clause 26. The method of clause 25, further comprising locking the slidable ribs relative to the at least one of the flexible elongated members in additional set positions, thereby preserving shape of the flexible elongated members and maintaining the contact between each of the pick-and-place mechanisms and the additional flexible composite part, wherein the additional set positions are different from the set positions, used for the flexible composite part.

Clause 27. The method of any clauses 23-26, wherein locking each of the slidable ribs relative to the at least one of the flexible elongated members is performed using a position lock.

Clause 28. The method of clause 27, wherein:
the position lock comprises a linear actuator, a cutout nut, and a threaded position shaft, fixedly connected to the at least one of the flexible elongated members;
the linear actuator is coupled to the cutout nut and configured to move the cutout nut relative to the threaded position shaft between a shaft-engaging position and a shaft-disengaging position; and
locking each of the slidable ribs relative to the at least one of the flexible elongated members comprises moving the cutout nut from the shaft-disengaging position to the shaft-engaging position.

CONCLUSION

Although the foregoing concepts have been described in some detail for purposes of clarity of understanding, it will be apparent that certain changes and modifications may be practiced within the scope of the appended clauses. It should be noted that there are many alternative ways of implementing the processes, systems, and apparatus. Accordingly, the present examples are to be considered as illustrative and not restrictive.

What is claimed is:

1. A flexible truss mechanism comprising:
flexible elongated members, extending along a principal axis of the flexible truss mechanism;
slidable ribs, coupled to each of the flexible elongated members and supporting the flexible elongated members with respect to each other, wherein:
the slidable ribs are spaced apart from each other along the principal axis of the flexible truss mechanism;
the slidable ribs are configured to receive and support one or more composite pick-and-place mechanisms; and
each of the slidable ribs is slidably coupled to at least one of the flexible elongated members, thereby allowing each of the slidable ribs to slide relative to the at least one of the flexible elongated members along the principal axis and allowing the flexible elongated members to bend about at least one axis, perpendicular to the principal axis.

2. The flexible truss mechanism of claim 1, wherein:
each of the slidable ribs comprises a position lock, for each of the flexible elongated members, slidable relative to the slidable ribs; and
the position lock is configured to lock a corresponding one of the slidable ribs in a set position, relative to the at least one of the flexible elongated members.

3. The flexible truss mechanism of claim 2, wherein:
the position lock is switchable between a locked position and an unlocked position;
when the position lock is in the locked position, the position lock prevents the corresponding one of the slidable ribs from sliding relative to the at least one of the flexible elongated members; and
when the position lock is in the unlocked position, the position lock allows the corresponding one of the slidable ribs to slide relative to the at least one of the flexible elongated members.

4. The flexible truss mechanism of claim 3, wherein:
the position lock comprises a linear actuator, a cutout nut, and a threaded position shaft, fixedly connected to the at least one of the flexible elongated members;
the linear actuator is coupled to the cutout nut and configured to move the cutout nut relative to the threaded position shaft between a shaft-engaging position and a shaft-disengaging position;
the shaft-engaging position corresponds to the locked position of the position lock; and
the shaft-disengaging position corresponds to the unlocked position of the position lock.

5. The flexible truss mechanism of claim 1, wherein each of the slidable ribs is slidably coupled to at least two of the flexible elongated members, thereby allowing each of the slidable ribs to slide relative to the at least two of the flexible elongated members along the principal axis.

6. The flexible truss mechanism of claim 1, wherein:
each of the slidable ribs comprises a sliding mechanism for each of the flexible elongated members, slidable relative to the slidable ribs; and
the sliding mechanism comprises one or more rollers, rollably engaging the at least one of the flexible elongated members.

7. The flexible truss mechanism of claim 1, wherein each of the slidable ribs comprises a plurality of supporting arms, wherein each of the plurality of supporting arms defines, at least in part, a distance between a corresponding pair of the flexible elongated members.

8. A flexible truss system comprising:
a flexible truss mechanism, comprising flexible elongated members, extending along a principal axis of the flexible truss mechanism, and slidable ribs, coupled to each of the flexible elongated members; and
pick-and-place mechanisms, wherein:
each of the pick-and-place mechanisms is supported by a corresponding one of the slidable ribs; and
each of the slidable ribs is slidably coupled to at least one of the flexible elongated members, thereby allowing each of the slidable ribs to slide relative to the at least one of the flexible elongated members along the principal axis and allowing the flexible elongated members to bend about at least one axis, perpendicular to the principal axis.

9. The flexible truss system of claim 8, further comprising a vacuum source, wherein each of the pick-and-place mechanisms comprises a suction cup, configured to be controllably connected to the vacuum source.

10. The flexible truss system of claim 8, wherein:
each of the slidable ribs comprises a position lock, for each of the flexible elongated members, slidable relative to the slidable ribs; and
the position lock is configured to lock a corresponding one of the slidable ribs in a set position, relative to the at least one of the flexible elongated members.

11. The flexible truss system of claim 10, wherein:
the position lock is switchable between a locked position and an unlocked position;
when the position lock is in the locked position, the position lock prevents the corresponding one of the slidable ribs from sliding relative to the at least one of the flexible elongated members; and
when the position lock is in the unlocked position, the position lock allows the corresponding one of the slidable ribs to slide relative to the at least one of the flexible elongated members.

12. The flexible truss system of claim 11, wherein:
the position lock comprises a linear actuator, a cutout nut, and a threaded position shaft, fixedly connected to the at least one of the flexible elongated members;
the linear actuator is coupled to the cutout nut and configured to move the cutout nut relative to the threaded position shaft between a shaft-engaging position and a shaft-disengaging position;
the shaft-engaging position corresponds to the locked position of the position lock; and
the shaft-disengaging position corresponds to the unlocked position of the position lock.

13. The flexible truss system of claim 12, further comprising a pressure source, wherein the linear actuator of the position lock of each of the slidable ribs is a pneumatic cylinder, controllably coupled to the pressure source.

14. The flexible truss system of claim 13, further comprising a system controller, communicatively coupled to the pressure source and configured to selectively connect and disconnect the linear actuator of the position lock of each of the slidable ribs from the pressure source.

15. A method of transferring a flexible composite part using a flexible truss system comprising a flexible truss mechanism and pick-and-place mechanisms, wherein the flexible truss mechanism comprises flexible elongated members and slidable ribs, coupled to each of the flexible elongated members and supporting the flexible elongated members with respect to each other, the method comprising:
sliding at least one of the slidable ribs relative to at least one of the flexible elongated members, thereby allowing the flexible elongated members to bend and allowing each of the pick-and-place mechanisms to form contact with the flexible composite part;
locking the slidable ribs relative to the at least one of the flexible elongated members in set positions, thereby preserving shape of the flexible elongated members and maintaining the contact between each of the pick-and-place mechanisms and the flexible composite part; and
transferring the flexible composite part using the flexible truss system while maintaining the contact between each of the pick-and-place mechanisms and the flexible composite part.

16. The method of claim 15, further comprising:
disengaging the flexible composite part from each of the pick-and-place mechanisms; and
unlocking the positions of the slidable ribs relative to the at least one of the flexible elongated members.

17. The method of claim 15, further comprising:
contacting an additional flexible composite part with each of the pick-and-place mechanisms, supported on the flexible truss mechanism, wherein:
contacting the additional flexible composite part comprises sliding at least one of the slidable ribs relative to at least one of the flexible elongated members, thereby allowing the flexible elongated members to bend and allowing each of the pick-and-place mechanisms to form contact with the additional flexible composite part; and
the additional flexible composite part and the flexible composite part have different shapes.

18. The method of claim 17, further comprising locking the slidable ribs relative to the at least one of the flexible elongated members in additional set positions, thereby preserving shape of the flexible elongated members and maintaining the contact between each of the pick-and-place mechanisms and the additional flexible composite part, wherein the additional set positions are different from the set positions, used for the flexible composite part.

19. The method of claim 15, wherein locking each of the slidable ribs relative to the at least one of the flexible elongated members is performed using a position lock.

20. The method of claim 19, wherein:
the position lock comprises a linear actuator, a cutout nut, and a threaded position shaft, fixedly connected to the at least one of the flexible elongated members;
the linear actuator is coupled to the cutout nut and configured to move the cutout nut relative to the threaded position shaft between a shaft-engaging position and a shaft-disengaging position; and
locking each of the slidable ribs relative to the at least one of the flexible elongated members comprises moving the cutout nut from the shaft-disengaging position to the shaft-engaging position.

* * * * *